Patented Oct. 12, 1954

2,691,653

UNITED STATES PATENT OFFICE 2,691,653

DERIVATIVES OF 4,5-DIPHENYLGLYOXALONEDISULFONIC ACID

William Wilson Williams, William Harris Libby, and Harlan Benjamin Freyermuth, Easton, Pa., assignors to General Aniline & Film Corporation, New York, N. Y., a corporation of Delaware No Drawing. Application October 24, 1950, Serial No. 191,938

6 Claims. (Cl. 260—247.1)

This invention relates to improved fluorescent agents derived from 4,5-diphenylglyoxalonedisulfonic acid.

The novel fluorescent agents of the present invention may be represented by the following general formula:

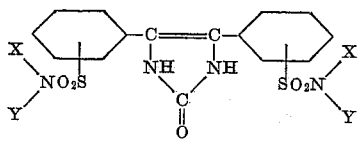

where the groups

represent the residues of ammonia or a primary or secondary aliphatic or aromatic amine.

For instance, if X is H, Y may be H, OH, alkyl or substituted alkyl such as $CH_3-$, $C_2H_5-$, $-CH_2CH_2OH$, $-(CH_2)_xSO_3H$, etc. aryl such as $C_6H_5-$, $CH_3OC_6H_4-$, $NO_2C_6H_4-$, $C_6H_5CH_2-$, $HO_3SC_6H_4-$, $HO_2CC_6H_4-$, $HO_2C(HO)C_6H_3-$, $NO_2(HO_3S)C_6H_3-$, $NH_2O_2SC_6H_4-$ $C_6H_5CONHC_6H_4-$, $C_6H_5NHC_6H_3(SO_3H)-$ $CH_3OC_6H_4NHC_6H_3(SO_3H)-$

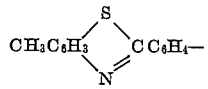

$C_{10}H_7$, (naphthyl), $HO_3S(HO)C_{10}H_5-$ $(HO_3S)_2(HO)C_{10}H_4-$, etc. heterocyclic such as pyridyl, quinolyl and the like. If X is alkyl or substituted alkyl such as methyl, ethyl, hydroxyethyl, etc., Y may be alkyl or substituted alkyl such as $CH_3-$, $C_2H_5-$, $CH_2CH_2OH$, etc. Finally X and Y together may go to form cyclic residues such as morpholine, thiomorpholine, etc.

These novel compounds are readily prepared, for example, by condensing one molecular proportion of 4,5 - diphenylglyoxalonedisulfonyl chloride with at least 2 molecular proportions of a primary or secondary amine. Ammonia and primary and secondary amines which can be reacted with 4,5 - diphenylglyoxalonedisulfonyl chloride include hydroxylamine, methylamine, ethylamine, ethanolamine, dimethylamine, benzylamine, diethanolamine, aniline, o-, m-, p-anisidine, naphthylamine, morpholine, piperidine, 2-, 3-, 4-aminopyridine, 1-, 2-, 3-, 4-, 5-, 6-, 7-aminoquinoline, thiomorpholine and the like.

These products are useful as additives to soaps and detergents in which case fabrics washed with these soaps or detergents will be much whiter in the case of whites and much brighter in the case of colors than the same fabrics washed with ordinary soaps or detergents.

The preparation of examples of the above-mentioned types are illustrated in the following examples. The parts are by weight.

Example I

A mixture of 24 parts of ethanolamine, 54 parts of the bis-sulfonyl chloride of 4,5-diphenylglyoxalonedisulfonic acid and 250 parts of water is heated at 90° for several hours. The mixture is cooled and the product isolated by filtration. It corresponds to the formula:

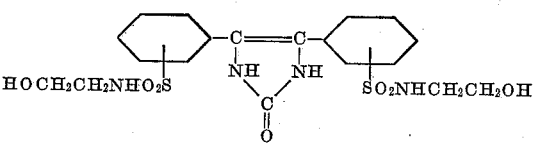

The material which is obtained is tan in color and moderately soluble in water but very slightly soluble in alcohol, acetone, ether, etc.

When this material is applied to fibers of wool, nylon or protein fibers in general, by methods well known in the art, the white appearance of the fabric is thereby much improved. It is found to be superior to 4,5-diphenylglyoxalonedisulfonic acid sodium salt for brightening wool when applied from non-acidic baths.

If small amounts of this substance are added to soaps or detergents and the resulting mixtures used to wash fabrics of wool, nylon or protein fibers in general, the white materials thus washed are much improved in whiteness and colored materials are brighter than the same materials washed using ordinary soaps or detergents.

Example II

Fifty-five parts of anthranilic acid is dissolved in 250 parts of water by the addition of 20% sodium carbonate solution. This solution is added slowly to a mixture of 108 parts of 4,5-diphenylglyoxalonedisulfonyl chloride, 33 parts of anhydrous sodium acetate and 500 parts of water, and the mixture is heated at 90° for several hours. The product is isolated by cooling the reaction mixture and filtering. It corresponds to the formula:

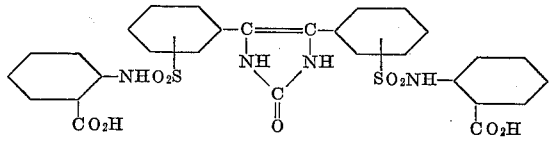

If this compound is used in the tests mentioned in Example I, the results are similar.

*Example III*

When 35 parts of morpholine were substituted for the ethanolamine in Example I, a disulfonamide of good whitening activity on wool was obtained.

*Example IV*

Example I was repeated except that 42 parts of diethanolamine was used in place of ethanolamine. The product showed wool brightening ability.

*Example V*

Example I was repeated except that 74 parts of dehydrothio-p-toluidinesulfonic acid was used in place of ethanolamine. The product showed affinity and good brightening action on cotton and wool.

These novel sulfonamide derivatives of 4,5-diphenyl-glyoxalonedisulfonic acid have been found to possess a substantial affinity for wool and are, therefore, of particular interest in detergent compositions which may be used for the laundering of woolens or other protein fibers.

It has been found that the particular amino residue in the novel sulfonamides of this invention does not substantially affect the fluorescent properties of the final compound. However, it may effect the solubility of the compound and, therefore, amino residues of high molecular weight are preferably avoided, since the final compound may be too water insoluble. Likewise, the sulfonamides derived from highly colored amines are preferably avoided since they may adversely affect the shade of fluorescence or actually color the product. However, the sulfonamides derived from uncolored amines, particularly those from primary monocyclic and bicyclic aryl amines containing no or simple nuclear substituents such as lower alkyl, lower alkoxy, halogen and trifluoromethyl substituents and carboxylic and sulfonic acid groups or those obtained from primary or secondary lower alkyl (1-4 carbon atoms) or lower alkylol amines, also those derived from such heterocyclic amines as morpholine and thiomorpholine are valuable fluorescent agents, and since their cost is generally lower, they constitute the preferred form of products of the present invention.

It will be apparent that the sulfonamides derived from amines containing sulfonic and carboxylic acid groups will be obtained in the form of their sodium salts in accordance with the procedures outlined in the foregoing examples. Ordinarily, these compounds are used in the form of their sodium salts in a mixture with detergents. However, if desired, the free acids may be obtained by acidification and their salts produced from the free acids, or if potassium salts are desired, they may be obtained by substituting potassium carbonate and acetate respectively, in the procedures described in the examples.

We claim:

1. Compounds of the formula:

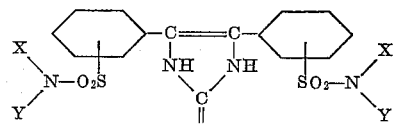

wherein the groups

are each the same and represent an amino radical selected from the group consisting of monoethanolamino, diethanolamino, morpholino, aminobenzoic acid and dehydrothio-p-toluidinosulfonic acid.

2. The compounds of the formula

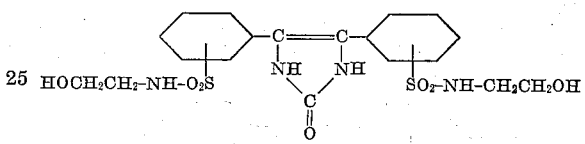

3. Fluorescent agents which in the form of the free acid have the formula

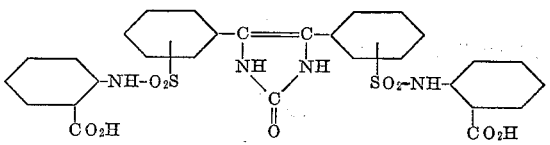

4. The compounds of the formula

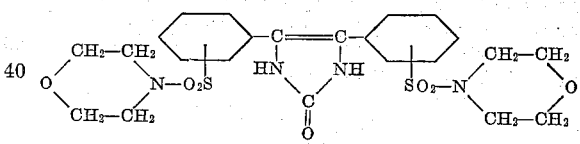

5. The compounds of the formula

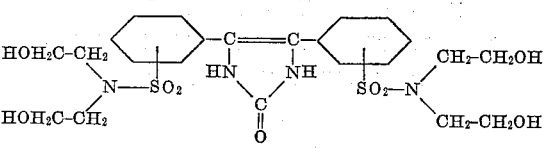

6. Fluorescent agents which in the form of the free acid have the formula

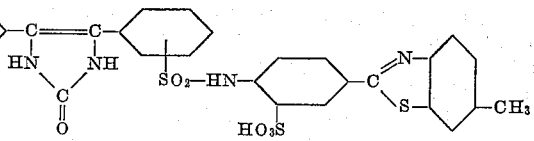

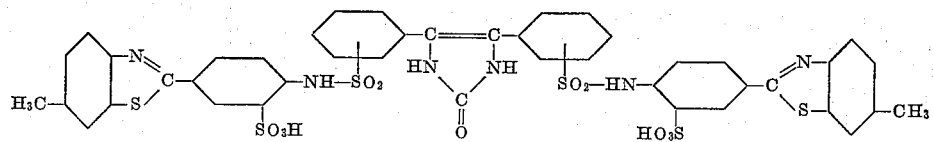

References Cited in the file of this patent

UNITED STATES PATENTS

| Number | Name | Date |
|---|---|---|
| 2,251,813 | West el al. | Aug. 5, 1941 |

FOREIGN PATENTS

| Number | Country | Date |
|---|---|---|
| 735,478 | Germany | May 18, 1943 |